March 22, 1966  R. G. DREWES  3,242,254
HOUSING FOR ELECTRIC COMPONENTS
Filed March 5, 1963
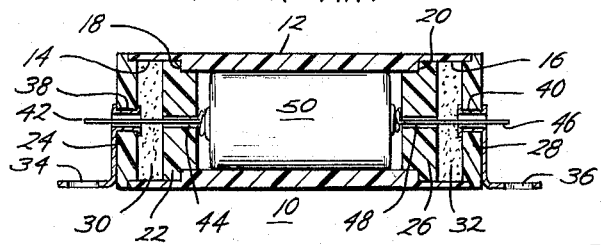
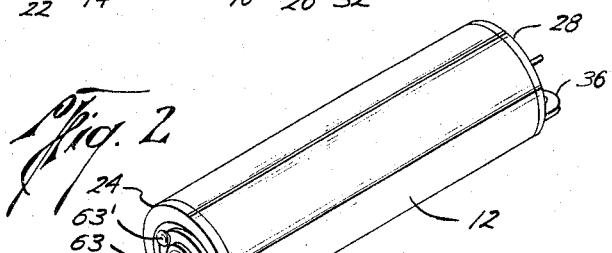
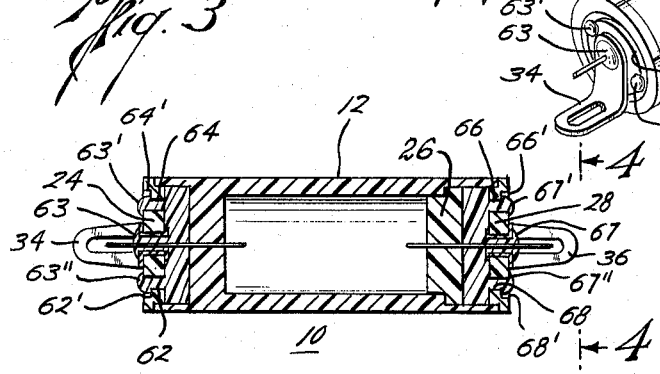
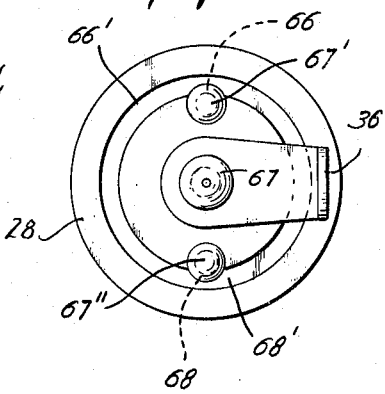
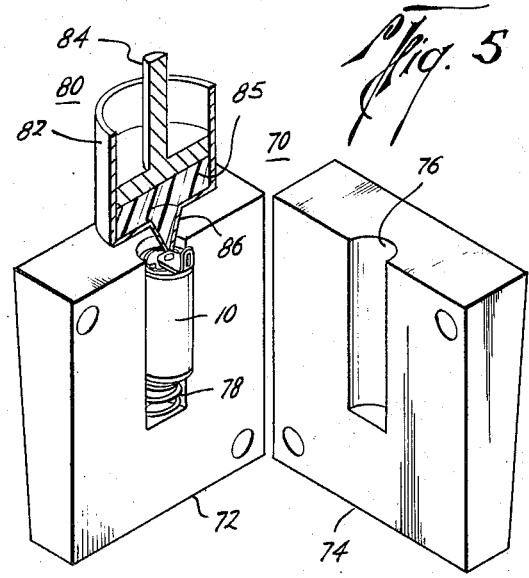
Raymond G. Drewes
INVENTOR.
BY Michael P. Breston
ATTORNEY

# United States Patent Office 3,242,254
Patented Mar. 22, 1966

3,242,254
HOUSING FOR ELECTRIC COMPONENTS
Raymond G. Drewes, Mendham, N.J., assignor to Weston Instruments, Inc., a corporation of Texas
Filed Mar. 5, 1963, Ser. No. 262,967
4 Claims. (Cl. 174—52)

This invention relates to housings for electric components and the like and more particularly to hermetically sealed plastic housings, especially suitable for small batteries, condensers, etc.

Many electric components often are required to be hermetically enclosed to prevent a deterioration or evaporation of their constituent elements. The need for suitable enclosures increases with the greater use of components placed under severe environmental physical conditions. Examples of such components are small batteries and electrolytic condensers.

Prior art housings for such components had at least a double disadvantage. The sealing up of the housings was too time consuming and because some gluing cement was employed, the electrolyte of batteries and electrolytic condensers eventually became contaminated by the cement.

Accordingly, it is an object of this invention to provide new and improved hermetically sealed housings especially suitable for storing small electric components.

It is another object of this invention to provide new and improved hermetically sealed plastic housings for batteries and the like which are economical to assemble and which do not require for their assembly harmful cements.

The above and other apparent objects of this invention are achieved by providing in a preferred embodiment a housing comprising a plastic casing having at least one open end adapted to receive a plastic cap and an end cover whereby a chamber is formed between said cap and said cover, said end cover defining an orifice and at least one counter sunk air vent, and a plastic substance filling said chamber, said orifice and said vent thereby riveting said end cover to said casing.

Other objects and features of this invention will become apparent from the following detailed description, taken in conjunction with the accompanying drawings in which:

FIGURE 1 is a longitudinal, sectional view of a typical prior art housing;

FIGURE 2 is a perspective view of a preferred embodiment of this invention;

FIGURE 3 is a longitudinal, sectional view of the embodiment of FIGURE 2;

FIGURE 4 is an end view of the embodiment shown in FIGURE 2; and

FIGURE 5 is an isometric view, partly in section, of a typical apparatus used during the sealing of the housing of FIGURE 2.

Referring to FIGURE 1, there is shown a typical prior art housing, generally designated as 10, made of glass or plexiglass. Housing 10 comprises a hollow, tubular casing 12 provided with recessed or undercut end portions 14 and 16, respectively defining shoulders 18 and 20. The left end of housing 10 is provided with a cap 22 and an end cover 24. Similarly, the right end of housing 10 is provided with a cap 26 and an end cover 28. Each of caps 22 and 26 has a restricted portion and an enlarged portion; the restricted portion has a diameter to allow for a tight fit against the inner wall of tube 12; and the enlarged portion has a diameter slightly smaller than the inner diameter of the recessed portion 14. In this fashion caps 22, 26 respectively are abutted against shoulders 18, 20. Similarly, end covers 24, 28 have restricted portions and enlarged portions; the restricted portions have a diameter to allow for a tight fit against the recessed portions 14, 16; and the enlarged portions have a diameter equal to the outside diameter of tube 12, as shown. Caps 22, 24 and caps 26, 28 are displaced whereby chambers 30 and 32 are defined, respectively. Caps 22, 26 are made typically of the same material as that of casing 12, whereas end covers 24, 28 are made of Bakelite or the like. Electric lugs 34, 36 respectively are affixed to end covers 24 and 28 through orifices 38 and 40, as shown. An electric conductor, such as a platinum wire 42, extends through orifice 38 and through an aperture 44 in cap 22. Similarly, a platinum wire 46 extends through orifice 40 in end cover 28 and through an aperture 48 in cap 26.

The final assembly of the left end of housing 10, in accordance with the prior art, is made as follows: first, the platinum wire 42 is cemented to the bottom of cap 22, as shown. Cap 22 is then cemented to shoulder 18. Then the end cover 24 is cemented to end 14. A suitable epoxy is used as the cementing agent. Typically also chamber 30 is filled with a Thiokol cement prior to the cementing of end cover 24. The positive terminal of a battery 50 is then brought to press against wire 44, as shown. The final assembly of the right end of housing 10 is then completed in a manner similar to the assembly of the left end.

It will be therefore appreciated that prior art housings included several cemented junctions. When the electrolyte of a typical battery 50 is cadmium sulfate or the like, the electrolyte may become contaminated by the cement.

The construction of the preferred embodiment in accordance with this invention is illustrated in FIGURES 2 through 5. To better bring out the analogy between the prior art housing and the housing of the present invention, like reference numerals are used to denote similar parts. Tube 12 is preferably made of a plastic material such as polyethylene. For convenience cap 22 is molded in with the casing 12. Cap 26 is shaped as before. End cover 24 is now provided with two diametrically opposed air vents 62, 64, respectively having counter-sunk portions 62', 64', as shown. Similarly, end cover 28 is provided with two diametrically opposed air vents 66, 68, respectively having counter-sunk portions 66', 68'. To seal in the caps and the end covers a liquid plastic preferably of polyethylene, such as Spencer No. 1504, is employed.

The method of sealing is very simple. First, the housing is mounted in a suitable support or mold, generally designated as 70, consisting of two sections 72, 74 which when assembled define a hollow, cylindrical chamber 76 for receiving housing 10. The bottom of chamber 76 carries a spring 78 for resiliently supporting housing 10. A simple piston-operated injection press 80 having a cylindrical housing 82 and an axially movable ram 84 is filled with liquid plastic polyethylene 85 which may be forced out through a nozzle 86 at the bottom of housing 82. Then the nozzle 86 is brought opposite to orifice 38 of end cover 24 and the ram is moved against the liquid plastic 85 forcing it into cavity 30. When cavity 30 is completely filled, some excess liquid plastic escapes through the air vents 62, 64 in end cover 24. The polyethylene plastic binds to the polyethylene cap 22 but not to the Bakelite end cover 24. The excess liquid plastic flows out from holes 38, 62, 64, fills the counter-sunk portions 62', 64' and, when solidified, forms respectively rivets 63, 63' and 63'' thereby mechanically securing the cap 22 and the Bakelite end cover 24 to the casing 12. This completes the sealing of the left end of housing 10. In a similar manner is sealed-up the right-end side of housing 10 whereby holes 40, 66, 68 are respectively provided with rivets 67, 67', 67''.

In this fashion, a hermetically sealed housing is provided and because no cement was employed, the possibility of electrolyte contamination is eliminated. It will be appreciated that the numerous time-consuming cementing operations previously required are no longer needed. After casing 12, caps 24, 26, 28 and wires 42, 44 are assembled, then the single step of injecting the molten plastic into cavities 30 and 32 completes the component holder.

While a preferred embodiment of my invention has been illustrated and described, it is to be understood that modifications as to form, arrangement of parts and use of materials may be made without departing from the spirit and scope of the invention as claimed herein.

What is claimed is:

1. An end seal assembly for hermetically sealing an electrical component in a cylindrical housing having at least one open end, an electrical component positioned within said housing and having at least one terminal lead, a flat annular end cover positioned between said electrical component and said open end, said end cover defining a central opening and at least one air vent, said terminal lead extending through said central opening which is of substantially larger diameter than said lead, a filled plastic material substantially completely filling the end volume of said container defined by the housing's inner wall and the end portion of said electrical component, said plastic material adhering to the inner wall of said housing, and said plastic material substantially completely filling the central opening which surrounds said terminal lead and the air vent in said end cover, said plastic material further extending through said air vent in said end cover to form a rivet for securing said end cover to said plastic material.

2. The end seal assembly of claim 1 wherein said end cover defines at least another air vent, each vent having a counter-sunk portion on the exposed face of said end cover, and said material forming a rivet-head on said end cover in said counter-sunk portion.

3. An end seal assembly for hermetically sealing an electrical component in a cylindrical housing having at least one open end, an electrical component positioned within said housing and having at least one terminal lead, an annular plastic cap positioned in said housing immediately opposite to the end portion of said component, a flat annular end cover positioned between said cap and said open end, said cap defining a central opening having a diameter slightly larger than the diameter of said terminal lead, said end cover defining a central opening and at least one air vent, said terminal lead extending through the opening in said cap and through the cover's central opening which is of substantially larger diameter than said lead, a filled plastic material substantially completely filling the end volume of said container defined by the housing's inner wall, the cap, and the inner surface of said end cover, said plastic material firmly adhering to the inner wall of said housing and to the plastic cap, and said material substantially completely filling the central opening surrounding said terminal lead and the air vent in said end cover, said material further extending through said air vent to form a rivet and thereby secure said end cover to said material and maintain the aforesaid elements in fixed spaced relationship.

4. The end seal assembly of claim 3 wherein said end cover defines at least another air vent, each vent having a counter-sunk portion on the exposed face of said end cover, and said material forming a rivet-head on said end cover in said counter-sunk portion.

References Cited by the Examiner

UNITED STATES PATENTS

| 2,266,523 | 12/1941 | Waterman | 174—152 |
|---|---|---|---|
| 2,451,516 | 10/1948 | Skobel | 174—51 |
| 2,628,271 | 2/1953 | Brafman | 136—133 |
| 2,700,140 | 1/1955 | Phillips | 174—77 |
| 2,941,024 | 6/1960 | Lamphier | 317—230 |

JOHN F. BURNS, *Primary Examiner.*